(12) United States Patent
Mason et al.

(10) Patent No.: US 9,651,648 B1
(45) Date of Patent: May 16, 2017

(54) PHASE DIFFERENCE OF ARRIVAL GEOLOCATION

(75) Inventors: John J. Mason, Albuquerque, NM (US); Louis Romero, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1356 days.

(21) Appl. No.: 13/527,383

(22) Filed: Jun. 19, 2012

(51) Int. Cl.
G01S 3/02 (2006.01)
G01S 3/48 (2006.01)
G01S 5/04 (2006.01)
G01S 5/02 (2010.01)
G01S 3/32 (2006.01)
G01S 3/22 (2006.01)
G01S 5/12 (2006.01)

(52) U.S. Cl.
CPC .............. *G01S 3/48* (2013.01); *G01S 5/0263* (2013.01); *G01S 5/04* (2013.01); *G01S 3/22* (2013.01); *G01S 3/32* (2013.01); *G01S 5/12* (2013.01)

(58) Field of Classification Search
CPC . G01S 5/12; G01S 5/04; G01S 5/0263; G01S 3/32; G01S 3/48; G01S 3/22
USPC .......................... 342/439, 442, 444, 451, 465
See application file for complete search history.

(56) References Cited

U.S. PATENT DOCUMENTS

| | | | | |
|---|---|---|---|---|
| 5,719,584 A * | 2/1998 | Otto | ........................... | G01S 5/12 342/387 |
| 5,914,687 A * | 6/1999 | Rose | .............................. | 342/442 |
| 5,999,129 A * | 12/1999 | Rose | .............................. | 342/394 |
| 5,999,131 A * | 12/1999 | Sullivan | .................. | G01S 1/045 342/465 |
| 6,285,319 B1 | 9/2001 | Rose | | |
| 6,407,703 B1 * | 6/2002 | Minter et al. | .................. | 342/450 |
| 7,453,400 B2 * | 11/2008 | Struckman et al. | ........... | 342/465 |
| 7,579,989 B2 * | 8/2009 | Winterling et al. | ........... | 342/450 |
| 7,893,875 B1 * | 2/2011 | Smith | ........................ | G01S 5/12 342/464 |
| 8,952,847 B2 * | 2/2015 | Peyrotte | ................ | B64G 1/1085 342/424 |
| 9,110,147 B1 * | 8/2015 | Mason | ........................ | G01S 3/02 |
| 2008/0117106 A1 * | 5/2008 | Sarno | .......................... | G01S 5/06 342/444 |
| 2011/0273328 A1 * | 11/2011 | Parker | ........................ | G01S 5/06 342/357.26 |

OTHER PUBLICATIONS

Jeff Mason and Louis Romero, "TOA/FOA Geolocation Solutions Using Multivariate Resultants", National Journal of The Institute of Navigation, vol. 52, No. 3, Fall 2005.

* cited by examiner

*Primary Examiner* — Chuong P Nguyen
(74) *Attorney, Agent, or Firm* — Medley, Behrens & Lewis, LLC

(57) ABSTRACT

Geolocation is performed by receiving, at a plurality of non-earthbound platforms each moving in a known manner within a spatial coordinate system, a radio frequency (RF) signal transmitted from a transmitter at an unknown location on earth within the spatial coordinate system. For each of the platforms, a phase change of the received frequency carrier is measured over the same duration of time. The measured phase changes are combined to determine the transmitter location.

20 Claims, 2 Drawing Sheets

PHASE DIFFERENCE OF ARRIVAL GEOLOCATION

This invention was developed under Contract DE-AC04-94AL85000 between Sandia Corporation and the U.S. Department of Energy. The U.S. Government has certain rights in this invention.

FIELD

The present work relates generally to radio frequency (RF) emitter geolocation and, more particularly, to geolocation techniques that use a plurality of satellite or airborne platforms to make measurements over time for a signal received at each of the platforms.

BACKGROUND

Some geolocation techniques in existence use a plurality of satellite or airborne platforms to make respective frequency difference of arrival (FDOA) measurements on a signal received from a transmitter located at an unknown location on earth. The location of the transmitter is determined based on the FDOA measurements. Although the accuracy of a frequency measurement increases with signal duration for signals of a fixed frequency, the situation is more complicated when the signal frequency changes due to oscillator drift and doppler changes. In this case, the FOA (frequency of arrival) at some point in the signal must be estimated from the frequency profile near the point.

It is therefore desirable to provide for geolocation techniques that accommodate signal frequency changes more readily than conventional FDOA techniques.

DETAILED DESCRIPTION

Figure 1:
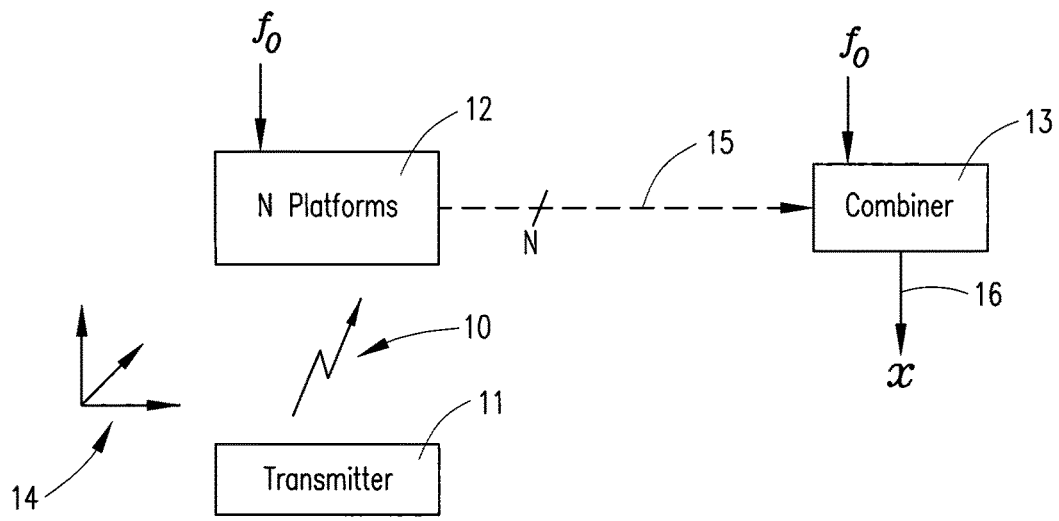
FIG. 1 diagrammatically illustrates a system that performs geolocation using a plurality of platforms to make respective phase change measurements over time for a signal transmitted by a transmitter at an unknown location according to example embodiments of the present work.

Example embodiments of the present work use a plurality of phase change measurements, made respectively at a plurality of satellite or airborne platforms over time, for a radio frequency signal transmitted by a stationary transmitter at an unknown location on earth. The platforms are moving in a known manner relative to spatial coordinate system. In some embodiments, the platforms are airborne platforms moving in the atmosphere of the earth. In some embodiments, the platforms are satellite platforms moving in space, beyond earth atmosphere. Various embodiments use various combinations of airborne and satellite platforms.

Within a given spatial coordinate system, the respective positions of the nth platform at the beginning (time t0) and end (time t1) of a period of time referred to herein as a temporal baseline, may be designated by $s_n^0$ for time t0, $s_n^1$ for time t1.

At each of the times t0 and t1, each platform measures the carrier phase of a received signal that has been transmitted by a transmitter at an unknown location on earth within the spatial coordinate system. Ignoring any modulation, the instantaneous carrier phase, measured in cycles, of the signal received at the nth platform may be written as $$ft - \|x - s_n^m\|/\lambda + \phi_n \qquad (1)$$

where m is an index indicating the beginning or end of the temporal baseline such that m=0 corresponds to time t0 and m=1 corresponds to time t1, f is the average carrier frequency, t is time, and x is the location vector for the transmitter relative to the spatial coordinate system. Also, any applicable combination of ionosphere phase advance, and electronics phase delay of the nth platform, is represented by $\phi_n$. The carrier wavelength $\lambda$ is c/f, where c is the speed of light.

It is well known that a received signal may be down-converted to baseband, or some other convenient frequency, while still preserving the phase information of the signal's propagation path changes over the duration of the temporal baseline. In this case, the instantaneous phase at the nth platform is $$\phi_n^m(t) = (f - f_0)t - \|x - s_n^m\|/\lambda + \phi_n \qquad (2)$$

where $f_0$ is the carrier frequency that is converted to DC in the down-conversion process.

Although the aforementioned ionosphere and platform electronics factors are unknown, they may be assumed constant over a sufficiently short period of time. The phase equation (2) may therefore be differenced over the temporal baseline from t0 to t1 to remove $\phi_n$, which yields the following phase difference of arrival (PDOA) equation that, for the nth platform, relates the measured phase change to the transmitter location $$\Delta\phi_n = (f - f_0)\Delta T - (\|x - s_n^1\| - \|x - s_n^0\|)/\lambda \qquad (3)$$

where $\Delta T = t1 - t0$, and f is the average carrier frequency over the temporal baseline. In various embodiments, $\Delta T$ has various values, ranging from many minutes to fractions of a second. As will be seen below, the embodiments described herein make two phase measurements per platform (at t0 and t1) to obtain a desired phased change measurement. Other embodiments use more than two phase measurements per platform, to reduce measurement noise.

With a three-dimensional spatial coordinate system (e.g., Cartesian, polar etc.,), there are a total of four unknowns in equation (3), namely, the average frequency f, plus three unknowns for the transmitter location vector x. Some embodiments therefore require phase change measurements for four or more platforms, providing at least four instances of equation (3), which may then be solved for the four unknowns. Some embodiments use an altitude constraint and require phase change measurements for three or more platforms.

Figure 2:
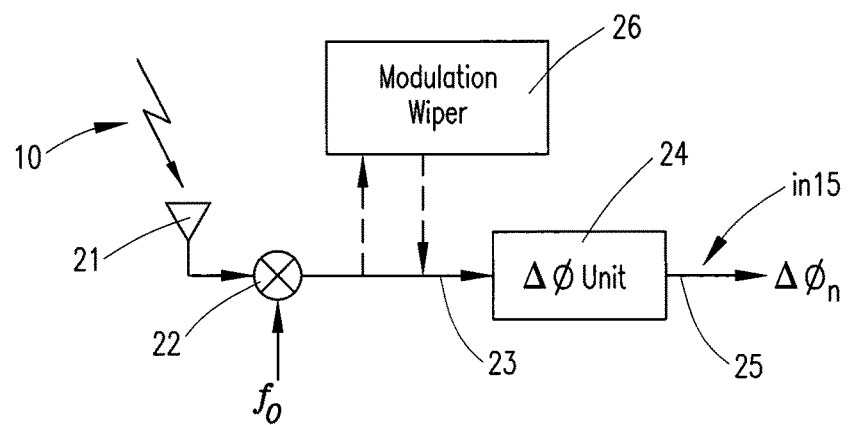
FIG. 2 diagrammatically illustrates an apparatus that makes phase change measurements over time for a received signal.

FIG. 1 diagrammatically illustrates a system capable of performing geolocation using techniques described above according to example embodiments of the present work. A transmitter 11 at an unknown location on earth within a spatial coordinate system 14 transmits an uplink RF signal 10 that is received at each of N platforms shown collectively at 12. FIG. 2 diagrammatically illustrates an apparatus provided in each of the N platforms according to example embodiments of the present work. An antenna 21 receives the uplink signal 10, which is then down-converted at 22 using a selected frequency $f_0$. The resulting down-converted signal 23 is input to a phase change ($\Delta\phi$) measurement unit 24, which measures phase change over the temporal baseline $\Delta T$ according to conventional techniques.

In typical operation, the phase change measurement unit 24 locks a phase locked loop (PLL, not explicitly shown) to a time series of down-converted (and possibly modulation-stripped) A/D samples of the carrier, and begins counting cycles after allowing some arbitrary time for the PLL to settle. The total cycle count over the duration of the temporal baseline $\Delta T$ is the desired phase change measurement. In some embodiments, the signals transmitted from the unknown location are phase modulated. For such embodiments, the phase modulation must be removed to permit the PLL to track the carrier. Any suitable conventional measure for modulation removal will suffice, such as the modulation wiper 26, shown included by broken line in FIG. 2. For example, BPSK modulation may be removed using a conventional BPSK wiper. Various conventional receivers, including typical GPS receivers, provide the functionality described above relative to FIG. 2, and are capable of making phase change measurements in the manner described above.

As shown in FIG. 2, the phase change measurement unit 24 outputs the phase change measurement (shown as $\Delta\phi_n$ for the nth platform) at 25. Referring also to FIG. 1, a combiner 13 receives at 15 phase change measurements 25 for each of the N platforms (n=1, 2, . . . N in FIG. 2), for a total of N phase change measurements 25. The combiner 13 implements equation (3) for each of the N platforms using the N phase change measurements, and combines these N equations to obtain the location vector x at 16. The aforementioned additional unknown in equation (3), average frequency f, is of course also determined by the combiner 13 as an ancillary part of solving for the location vector x.

In some embodiments, time synchronization is maintained among the N platforms. Such time synchronization among platforms is conventionally available. At a predetermined absolute start time, known to the platforms and the combiner 13, all N platforms begin making simultaneous phase change measurements. Alternatively the platforms may simply digitize and time-stamp the samples and communicate the samples to another location where the phase change measurements may be made. In other embodiments such as the analogue bent-pipe embodiments described further below, time synchronization per se is not required, however frequency synchronization at the platforms is required in all cases to eliminate uncontrolled phase changes due to oscillator drift.

The communication of the N phase change measurements is shown by broken line in FIG. 1 to indicate the various manners of communication in various embodiments. In some embodiments, the phase change measurements are communicated via downlink to a ground station that contains the combiner 13. In some embodiments, the combiner 13 is located on earth but remote from the ground station, and the phase change measurements are communicated to the remote combiner electronically or by a suitable portable storage medium. In some embodiments, the phase change measurements are communicated to one of the N platforms (or a further platform) that contains the combiner 13.

Consider now a conventional bent-pipe system, wherein the uplink signal (see 10 in FIG. 1) received at a platform is translated in frequency and relayed by downlink to a ground station. According to example embodiments of the present work, equation (3) may be applied in such a bent-pipe system. The phase change measurements are made at the ground station in generally the same manner described above, but the measurements may be referenced to the platform as follows. The phase change of a signal received at the ground station is the phase change of the signal received at the platform plus the phase change associated with the downlink. An accurate estimate of the downlink phase change over the temporal baseline may be calculated using a formulation generally analogous to equation (3). But here, the frequency f is the downlink relay frequency, and the location vector x represents the known location of the ground station. Once the estimate of the downlink phase change is calculated, it may be removed, while still preserving the desired uplink phase change. The downlink relay frequency in a bent-pipe system is a known multiple (or fraction) of the uplink frequency. However, the uplink frequency is unknown, as noted above. Therefore, some embodiments select some initial estimate for the downlink frequency, and iteratively correct this estimate as the uplink frequency is determined (i.e., during the process of determining the unknown transmitter location). In some embodiments, the downlink frequency may be known well enough before the uplink frequency is determined.

To remove the downlink phase change, some embodiments multiply in-phase and quadrature A/D samples of the received downlink signal by a complex exponential constructed from the complex conjugate of the calculated estimate of the downlink phase change. The corrected samples may then be used to make phase change measurements in the same manner described above relative to FIG. 2.

Figure 3:
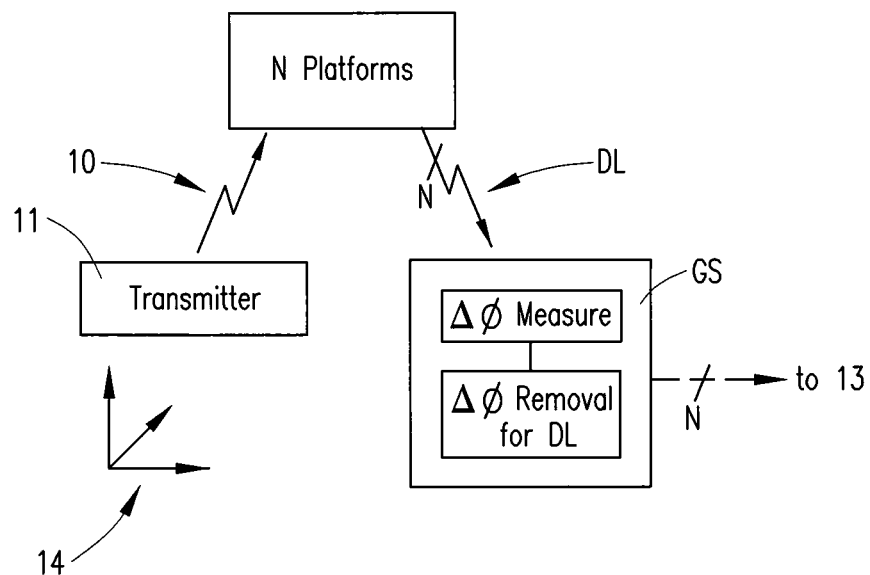
FIG. 3 diagrammatically illustrates a bent-pipe system according to example embodiments of the present work.

FIG. 3 shows a bent-pipe system according to example embodiments of the present work. A ground station GS receives N signals on downlink (DL) relay from N platforms, and performs N phase change measurements, with the downlink phase change removed, as described above. The resulting N phase change measurements (corresponding to the N phase change measurements shown at 15 and 25 in FIGS. 1 and 2) are provided to combiner 13.

Figure 4:
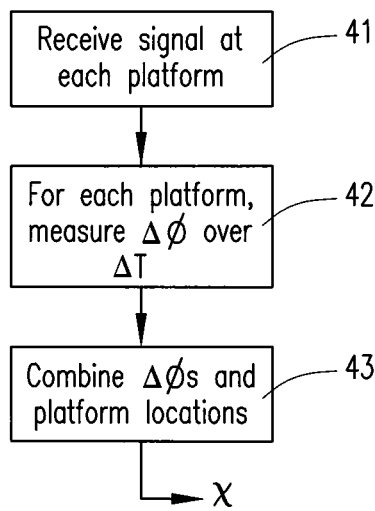
FIG. 4 illustrates operations that may be performed according to example embodiments of the present work.

FIG. 4 illustrates operations that may be performed according to example embodiments of the present work. At 41, the signal transmitted by the transmitter is received by each of the N platforms. For each platform, an associated phase change measurement is made over a selected temporal baseline $\Delta T$ at 42. At 43, equation (3) is applied for each of the N platforms, and the N versions of equation (3) are combined, such that the phase change measurements and platform locations are used to solve for the location vector x.

The phase measurements used according to the present work permit rapidly changing signal frequency to be accommodated in FOA-based RF emitter geolocation. Although RF emitter geolocation using signal phase measurements from a satellite platform has been known for several decades (for example, in the US Navy's TRANSIT system), that conventional technique relied on large angular movements of a single satellite whereas embodiments of the present work may use much smaller angular movements by multiple platforms Although example embodiments of the present work are described above in detail, this does not limit the scope of the present work, which can be practiced in a variety of embodiments.

It is claimed:

1. A method of geolocating a transmitter located on earth, comprising:
   receiving, at a plurality of non-earthbound platforms each moving in a known manner within a spatial coordinate system, a frequency carrier transmitted from the transmitter at an unknown location on earth within the spatial coordinate system;

for each of the platforms, over a same duration of time, measuring a phase change of the received frequency carrier between the transmitter and an associated platform; and combining the measured phase changes to determine the transmitter location;

wherein said measured phase changes correspond to respective simultaneous receptions of the frequency carrier at the respective platforms over said same duration of time, and wherein at least three said measured phase changes must be combined to determine the transmitter location.

2. The method of claim 1, wherein said measuring for each platform includes measuring the respective phase changes simultaneously.

3. The method of claim 1, wherein said combining includes combining each of the measured phase changes with respective locations of the corresponding platform in the spatial coordinate system at a beginning of said duration of time and at an end of said duration of time.

4. The method of claim 1, wherein each said platform is one of an airborne platform moving in earth atmosphere and a satellite platform moving in space beyond earth atmosphere.

5. The method of claim 1, wherein said measuring for each platform is performed at the respective platform.

6. The method of claim 1, wherein said measuring for each platform is performed at a ground station.

7. A system for geolocating a transmitter located on earth, comprising:

a plurality of phase change measurement units respectively associated with a plurality of non-earthbound platforms that each moves in a known manner within a spatial coordinate system, each of said phase change measurement units configured to measure, over a same duration of time, a phase change of a frequency carrier transmitted from the transmitter and received at the associated platform, wherein the transmitter is at an unknown location on earth within the spatial coordinate system; and a combiner in communication with said phase change measurement units and configured to combine said measured phase changes to determine the transmitter location;

wherein said measured phase changes correspond to respective simultaneous receptions of the frequency carrier at the respective platforms over said same duration of time, and wherein at least three said measured phase changes must be combined to determine the transmitter location.

8. The apparatus of claim 7, wherein said combiner is configured to combine each of the measured phase changes with respective locations of the corresponding platform in the spatial coordinate system at a beginning of said duration of time and at an end of said duration of time.

9. The apparatus of claim 7, wherein each said platform is one of an airborne platform moving in earth atmosphere and a satellite platform moving in space beyond earth atmosphere.

10. The apparatus of claim 7, wherein said phase change measurement units are respectively located on said platforms.

11. The apparatus of claim 7, wherein said phase change measurement units are located at a ground station.

12. A method of geolocating a transmitter located on earth, comprising:

receiving a plurality of measured phase changes respectively associated with a plurality of non-earthbound platforms, wherein each said measured phase change is a measurement, over a same duration of time, of a phase change of a frequency carrier that is transmitted from the transmitter and received at the associated platform, wherein the transmitter is at an unknown location on earth within a spatial coordinate system, and further wherein the associated platform receives the frequency carrier while the associated platform is moving in a known manner within the spatial coordinate system; and combining the measured phase changes to determine the transmitter location;

wherein said measured phase changes correspond to respective simultaneous receptions of the frequency carrier at the respective platforms over said same duration of time, and wherein at least three said measured phase changes must be combined to determine the transmitter location.

13. The method of claim 12, wherein said combining includes combining each of the measured phase changes with respective locations of the corresponding platform in the spatial coordinate system at a beginning of said duration of time and at an end of said duration of time.

14. The method of claim 12, wherein each said platform is one of an airborne platform moving in earth atmosphere and a satellite platform moving in space beyond earth atmosphere.

15. The method of claim 12, wherein said measured phase changes are measurements respectively performed on said platforms.

16. The method of claim 12, wherein said measured phase changes are measurements performed at a ground station.

17. An apparatus for geolocating a transmitter located on earth, comprising:

an input for receiving a plurality of measured phase changes respectively associated with a plurality of non-earthbound platforms, wherein each said measured phase change is a measurement, over a same duration of time, of a phase change of a frequency carrier that is transmitted from the transmitter and received at the associated platform, wherein the transmitter is at an unknown location on earth within a spatial coordinate system, and further wherein the frequency carrier is received at the associated platform while the associated platform is moving in a known manner within the spatial coordinate system; and a combiner coupled to said input and configured to combine the measured phase changes to determine the transmitter location;

wherein said measured phase changes correspond to respective simultaneous receptions of the frequency carrier at the respective platforms over said same duration of time, and wherein at least three said measured phase changes must be combined to determine the transmitter location.

18. The apparatus of claim 17, wherein each said platform is one of an airborne platform moving in earth atmosphere and a satellite platform moving in space beyond earth atmosphere.

19. The apparatus of claim 17, wherein said measured phase changes are measurements respectively performed by said platforms.

20. The apparatus of claim 17, wherein said measured phase changes are measurements performed by a ground station.

* * * * *